(12) United States Patent
Zeng et al.

(10) Patent No.: US 11,093,162 B2
(45) Date of Patent: Aug. 17, 2021

(54) METHOD AND APPARATUS FOR DELETING CASCADED SNAPSHOT

(71) Applicant: HUAWEI TECHNOLOGIES CO., LTD., Shenzhen (CN)

(72) Inventors: Qiang Zeng, Chengdu (CN); Qiang Wei, Guiyang (CN); Wei Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 27 days.

(21) Appl. No.: 16/370,959

(22) Filed: Mar. 30, 2019

(65) Prior Publication Data

US 2019/0227733 A1     Jul. 25, 2019

Related U.S. Application Data

(63) Continuation of application No. PCT/CN2017/081345, filed on Apr. 21, 2017.

(30) Foreign Application Priority Data

Sep. 30, 2016   (CN) .......................... 201610874664.X (51) Int. Cl.
*G06F 3/06*      (2006.01)

(52) U.S. Cl.
CPC .......... *G06F 3/0652* (2013.01); *G06F 3/0604* (2013.01); *G06F 3/0608* (2013.01); *G06F 3/0647* (2013.01); *G06F 3/0673* (2013.01); *G06F 3/065* (2013.01); *G06F 3/0623* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 7,165,156 B1 | 1/2007 | Cameron et al. | |
| 8,515,911 B1 * | 8/2013 | Zhou | ................... G06F 16/1873 707/638 |
| 2004/0158566 A1 | 8/2004 | Chong et al. | |
| 2006/0047926 A1 | 3/2006 | Zheng | |

(Continued)

FOREIGN PATENT DOCUMENTS

| | | |
|---|---|---|
| CN | 101140536 A | 3/2008 |
| CN | 101133383 A | 5/2008 |

(Continued)

*Primary Examiner* — Charles Rones
*Assistant Examiner* — Ryan Dare
(74) *Attorney, Agent, or Firm* — Hauptman Ham, LLP (57) ABSTRACT

In a method for deleting a cascaded snapshot, a storage device includes a logical volume corresponding to a plurality of cascaded snapshots. The plurality of cascaded snapshots comprises at least a first snapshot, a second snapshot, and a third snapshot. The second snapshot is a parent snapshot of the first snapshot, the third snapshot being a child snapshot of the first snapshot. The storage device receives an instruction for deleting the first snapshot. The first snapshot comprises target data. The storage device migrates information of the target data to the second snapshot. Further, the storage device sets a parent snapshot identifier corresponding to the third snapshot to an identifier of the second snapshot, and deletes the first snapshot.

8 Claims, 6 Drawing Sheets

(56) References Cited

U.S. PATENT DOCUMENTS

| | | | |
|---|---|---|---|
| 2007/0083567 A1 | 4/2007 | Arai | |
| 2008/0155169 A1 | 6/2008 | Hiltgen et al. | |
| 2009/0055607 A1* | 2/2009 | Schack | G06F 11/1435 711/162 |
| 2009/0276593 A1* | 11/2009 | Jacobson | G06F 3/065 711/162 |
| 2012/0166757 A1* | 6/2012 | Volvovski | G06F 3/0689 711/206 |
| 2012/0166868 A1* | 6/2012 | Volvovski | H04L 67/1097 714/6.22 |
| 2012/0226933 A1* | 9/2012 | Baptist | G06F 11/0757 714/6.2 |
| 2015/0127618 A1* | 5/2015 | Alberti | G06F 8/63 707/678 |
| 2016/0231944 A1 | 8/2016 | Litke et al. | |
| 2017/0315728 A1* | 11/2017 | Zheng | G06F 3/0604 |

FOREIGN PATENT DOCUMENTS

| | | |
|---|---|---|
| CN | 103077099 A | 5/2013 |
| CN | 103473277 A | 12/2013 |
| CN | 104360914 A | 2/2015 |
| CN | 106569738 A | 4/2017 |

* cited by examiner

METHOD AND APPARATUS FOR DELETING CASCADED SNAPSHOT

CROSS-REFERENCE TO RELATED APPLICATIONS

This application is a continuation of International Application No. PCT/CN2017/081345, filed on Apr. 21, 2017, which claims priority to Chinese Patent Application No. 201610874664.X filed on Sep. 30, 2016. The disclosures of the aforementioned applications are hereby incorporated by reference in their entireties.

TECHNICAL FIELD

The present invention relates to the field of computer application technologies, and in particular, to a method and an apparatus for deleting a cascaded snapshot.

BACKGROUND

With development of computer technologies, data backup is increasingly important. In a conventional data backup manner, important data information is protected by using technologies such as data replication, backup, and restoration. However, this backup manner is at relatively great expense, has relatively high costs, consumes a large amount of time and system resources, and takes a relatively long data restoration time. Because a data backup process affects system performance, the system may stop external services and fail to meet requirements of some services that need to be run uninterruptedly.

A data snapshot technology can well resolve the foregoing technical problem. A snapshot is an image of a data set at a specific moment, and is also referred to as an instant copy. The snapshot is a complete available copy of the data set. In an application scenario of a virtual machine, a snapshot may be used as a carrier of a virtual machine, and in this case, the snapshot may also be read and written. To save data in the snapshot, a snapshot, namely, a cascaded snapshot, may be further taken for the snapshot. The cascaded snapshot may be shown in FIG. 1. A snapshot 1 is a snapshot taken for a source logical volume number (LUN), and a snapshot 2 is a snapshot taken for the snapshot 1. In this case, the snapshot 2 retains content of the snapshot 1, and a user may modify the snapshot 1 without worrying about losing the original snapshot content. Likewise, a snapshot 3 is a snapshot taken for the snapshot 2, and the user may modify the snapshot 2. Modified content of the snapshot 2 may be different from modified content of the snapshot 1. The snapshot 2 is a child snapshot of the snapshot 1 and is a parent snapshot of the snapshot 3.

Figure 1:
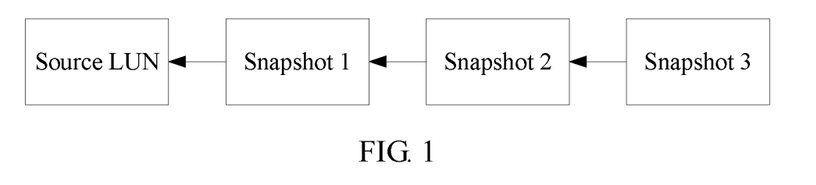
FIG. 1 is a schematic diagram of cascaded snapshots according to an embodiment of the present invention.

When a child snapshot in cascaded snapshots is read, data needs to be queried upwards layer by layer. For example, when the snapshot 3 in FIG. 1 is read, data in the snapshot 3, the snapshot 2, the snapshot 1, and the source LUN needs to be read sequentially. Complete data at a specific moment that needs to be protected by the snapshot 3 can be obtained only in this way.

Therefore, in the prior art, deletion of a parent snapshot having a child snapshot is not allowed. For example, if the snapshot 2 in FIG. 1 is directly deleted, when the snapshot 3 is read, because data in the snapshot 2 cannot be read, a data reading failure or error is caused. Therefore, if the snapshot 2 needs to be deleted, the snapshot 3 needs to be deleted first. However, in some cases, data in a parent snapshot may no longer be needed, but data in a child snapshot of the parent snapshot still needs to be retained. Because the child snapshot cannot be deleted, a waste of resources is caused.

SUMMARY

Embodiments of the present invention provide a method and an apparatus for deleting a cascaded snapshot, to delete a snapshot having a child snapshot in cascaded snapshots and ensure that a data image in the child snapshot does not change after the deletion of the snapshot.

According to a first aspect, an embodiment of the present invention provides a method for deleting a cascaded snapshot. The method may be applied to a storage device. The storage device includes a logical volume, the logical volume corresponds to a plurality of cascaded snapshots, and the plurality of cascaded snapshots include at least a first snapshot, a second snapshot, and a third snapshot. The first snapshot includes target data. The second snapshot is a parent snapshot of the first snapshot. The parent snapshot of the first snapshot may be an independent snapshot or may be the logical volume. The third snapshot is a child snapshot of the first snapshot. The method specifically includes:

after receiving an instruction for deleting the first snapshot, migrating information of the target data in the first snapshot to the second snapshot, where the information of the target data includes a timestamp of the first snapshot, and the timestamp of the first snapshot is set when the first snapshot is created; setting a parent snapshot identifier corresponding to the third snapshot to an identifier of the second snapshot, so that the set parent snapshot identifier corresponding to the third snapshot indicates that a parent snapshot of the third snapshot is the second snapshot; and deleting the first snapshot.

In the foregoing embodiment, when the first snapshot is to be deleted, in other words, a snapshot at an intermediate layer of the cascaded snapshots is to be deleted, the target data in the first snapshot is migrated to the second snapshot, the parent snapshot of the first snapshot. In this way, when the third snapshot, a child snapshot of the first snapshot, is read after the first snapshot is deleted, the target data in the original first snapshot can still be read from the second snapshot, and no data reading failure or data reading error is caused.

With reference to the first aspect, in a first possible implementation of the first aspect, each cascaded snapshot corresponding to the logical volume has one timestamp, and the timestamp of each cascaded snapshot is unique. In the cascaded snapshots, a plurality of snapshots may be taken for the logical volume, and each snapshot includes a plurality of child snapshots. In this case, snapshot data is cumbersome, and the case is complex: data confusion may be caused when the third snapshot is read after the first snapshot is deleted. By contrast, the unique timestamp is set for each cascaded snapshot of the logical volume, in other words, each cascaded snapshot of the logical volume has a unique identifier, and therefore, when the third snapshot is read after the first snapshot is deleted, correct data may be successfully read based on the unique timestamp, without causing data confusion.

With reference to the first aspect, in a second possible implementation of the first aspect, the target data in the first snapshot includes copy-on-write data and/or private data, the copy-on-write data is data that is copied when copy-on-write is performed on the first snapshot, and the private data is data that is written when a write operation is performed on the first snapshot. If the target data includes the copy-onwrite data, when the information of the target data is migrated to the second snapshot, information of the copy-on-write data is migrated to copy-on-write data in the second snapshot. If a write operation is performed on content of the first snapshot after the third snapshot, the child snapshot of the first snapshot, is created, source data in the first snapshot is first copied to the copy-on-write data and then to-be-written data is written to the private data. Therefore, if the first snapshot includes the copy-on-write data, it indicates that a write operation has been performed on the data in the first snapshot after the third snapshot is created. When the third snapshot is read, data that is in the first snapshot when the third snapshot is created needs to be read, in other words, the data in the copy-on-write data needs to be read. Therefore, the information of the copy-on-write data in the first snapshot is migrated to the copy-on-write data in the second snapshot.

With reference to the first aspect, in a third possible implementation method of the first aspect, the target data in the first snapshot includes copy-on-write data and/or private data, the copy-on-write data is data that is copied when copy-on-write is performed on the first snapshot, and the private data is data that is written when a write operation is performed on the first snapshot. If the target data does not include any copy-on-write data, when the information of the target data is migrated to the second snapshot, information of the private data is migrated to copy-on-write data in the second snapshot. If the first snapshot does not include any copy-on-write data, it indicates that no write operation has been performed on the first snapshot after the third snapshot is created. In this case, the data in the private data is data that is in the first snapshot when the third snapshot is created. Therefore, the information of the private data in the first snapshot is migrated to the copy-on-write data in the second snapshot.

With reference to the first aspect, in a fourth possible implementation method of the first aspect, the information of the target data further includes an address of the target data. Because the address of the target data is migrated, a migration process can be quickly implemented to improve system efficiency.

With reference to the first aspect, in a fifth possible implementation method of the first aspect, the unique timestamp may be obtained by using the following method: when creating a snapshot, obtaining a timestamp of the logical volume; setting a timestamp of the created snapshot to a sum of the current timestamp of the logical volume and a preset threshold; and setting a timestamp of a parent snapshot of the created snapshot, a timestamp of a parent snapshot of the parent snapshot, and so on till a timestamp of the source logical volume, to increase in ascending order, where the timestamp of the parent snapshot of the created snapshot is greater than the timestamp of the created snapshot. By using the foregoing method, it can be ensured that the timestamp of each snapshot corresponding to the source logical volume is unique, so that when the third snapshot is read after the first snapshot is deleted, correct data can be read from the second snapshot based on the unique timestamp.

According to a second aspect, an apparatus for deleting a cascaded snapshot provided in an embodiment of the present invention is applied to a storage device. The storage device includes a logical volume, the logical volume corresponds to a plurality of cascaded snapshots, and the plurality of cascaded snapshots include at least a first snapshot, a second snapshot, and a third snapshot. The second snapshot is a parent snapshot of the first snapshot. The parent snapshot of the second snapshot may be an independent snapshot or may be the logical volume. The third snapshot is a child snapshot of the first snapshot. The apparatus includes:

a receiving module, configured to receive an instruction for deleting the first snapshot, where the first snapshot includes target data;

a migration module, configured to migrate information of the target data to the second snapshot, where the information of the target data includes a timestamp of the first snapshot, and the timestamp of the first snapshot is set when the first snapshot is created;

a setting module, configured to set a parent snapshot identifier corresponding to the third snapshot to an identifier of the second snapshot, where the set parent snapshot identifier corresponding to the third snapshot indicates that a parent snapshot of the third snapshot is the second snapshot; and a deletion module, configured to delete the first snapshot.

With reference to the second aspect, in a first possible implementation method of the second aspect, each cascaded snapshot corresponding to the logical volume has one timestamp, and the timestamp of each cascaded snapshot is unique.

With reference to the second aspect, in a second possible implementation method of the second aspect, the target data includes copy-on-write data and/or private data, the copy-on-write data is data that is copied when copy-on-write is performed on the first snapshot, and the private data is data that is written when a write operation is performed on the first snapshot; and when the target data includes the copy-on-write data, the migration module is specifically configured to migrate information of the copy-on-write data to copy-on-write data in the second snapshot.

With reference to the second aspect, in a third possible implementation method of the second aspect, the target data includes copy-on-write data and/or private data, the copy-on-write data is data that is copied when copy-on-write is performed on the first snapshot, and the private data is data that is written when a write operation is performed on the first snapshot; and when the target data does not include any copy-on-write data, the migration module is specifically configured to migrate information of the private data to copy-on-write data in the second snapshot.

With reference to the second aspect, in a fourth possible implementation method of the second aspect, the information of the target data further includes an address of the target data.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

To delete a snapshot having a child snapshot from cascaded snapshots, an embodiment of the present invention provides a method for deleting a cascaded snapshot. The method may be applied to a storage device.

Figure 2:
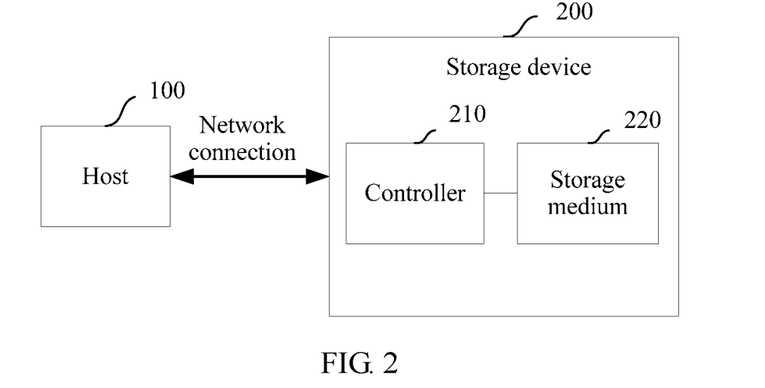
FIG. 2 is a schematic structural diagram of a data processing system according to an embodiment of the present invention.

The method for deleting a cascaded snapshot provided in this embodiment of the present invention may be applied to a data processing system shown in FIG. 2. The system includes at least a host 100 and a storage device 200. The data processing system may be a storage area network (SAN), or may be a network attached storage (NAS) device.

The host 100 is configured to execute an application program and send a control instruction to the storage device 200, to read and write data. The control instruction includes input/output instructions.

The storage device 200 may be a device such as a disk array and is configured to store data and an operation instruction. As shown in the figure, the storage device 200 may include a controller 210 and a storage medium 220.

Figure 3:
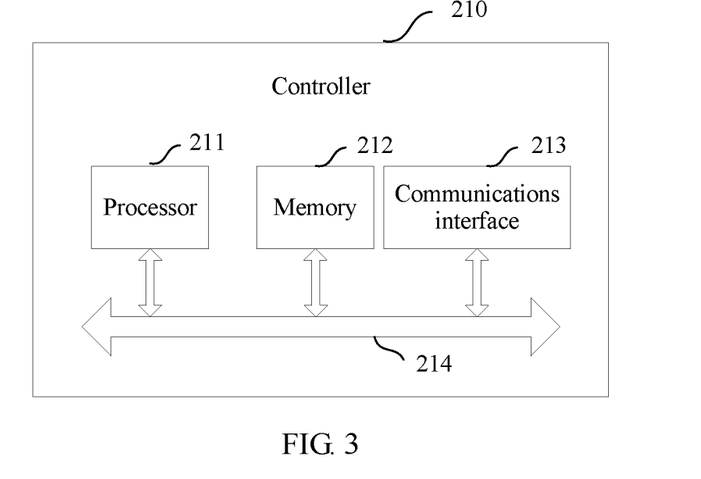
FIG. 3 is a schematic structural diagram of a controller that applies to an embodiment of the present invention.

As shown in FIG. 3, the controller 210 may further include a processor 211, a memory 212, a communications interface 213, and a bus 214.

The processor 211 may be a central processing unit (CPU), a network processor (NP), or the like. Alternatively, the processor 211 may be a digital signal processor (DSP), an application-specific integrated circuit (ASIC), a field programmable gate array (FPGA), another programmable logic component, or the like.

The memory 212 may be configured to store a program and data when the processor 211 performs an operation.

The storage medium 220 may include a plurality of disks. The disk is physical storage space.

A logical volume is a logical partition that is obtained through division based on the physical storage space at a software layer. The logical volume may be expanded or shrunk as required. When data backup is required, a snapshot may be used to save a data state, at a specific moment, of a source logical volume. The snapshot may also be deemed as a logical volume.

Cascaded snapshots related to this embodiment of the present invention mean that after a child snapshot is created for the source logical volume, a child snapshot or child snapshots of even more layers may be further created for the child snapshot. Therefore, the cascaded snapshots include at least a first snapshot, a second snapshot, and a third snapshot. The second snapshot is a parent snapshot of the first snapshot. The parent snapshot of the second snapshot may be an independent snapshot or may be a source logical volume. The third snapshot is a child snapshot of the first snapshot.

Figure 4:
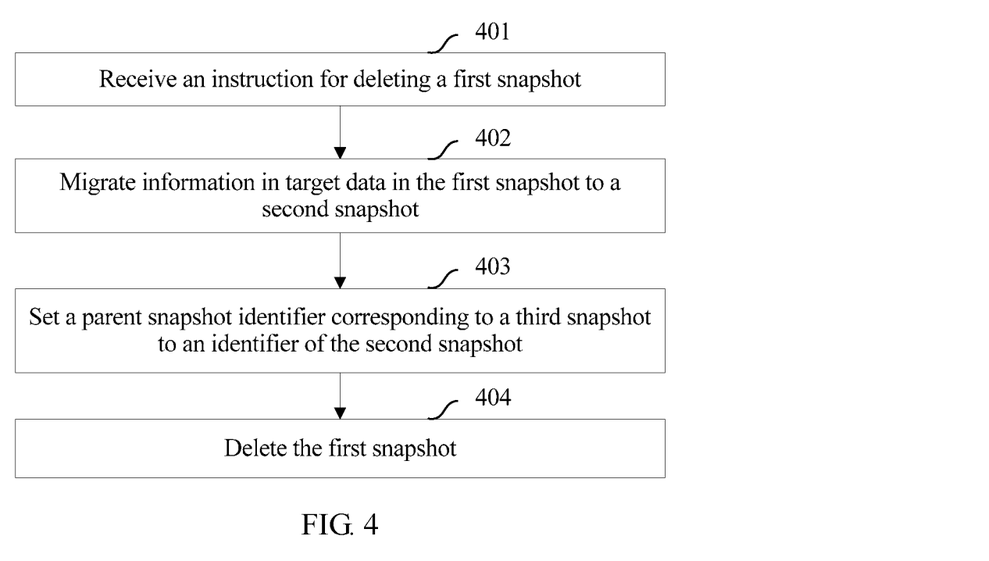
FIG. 4 is a schematic flowchart of a method for deleting a cascaded snapshot according to an embodiment of the present invention.

FIG. 4 is a schematic flowchart of a method for deleting a cascaded snapshot according to an embodiment of the present invention. The method may be performed by the processor 211 in FIG. 3, and by reading the program from the memory 212 to perform the following steps.

Step 401: Receive an instruction for deleting a first snapshot.

Step 402: Migrate information of target data in the first snapshot to a second snapshot.

Optionally, the information of the target data includes a timestamp of the first snapshot, and the timestamp of the first snapshot is set when the first snapshot is created; each cascaded snapshot corresponding to a source logical volume has one timestamp, and the timestamp of each cascaded snapshot is unique.

After the information of the target data in the first snapshot is migrated to the second snapshot, because the information of the target data includes a globally unique timestamp, the target data in the first snapshot can be distinguished from data in the second snapshot, so that when a third snapshot is read subsequently, data required for the third snapshot can be determined based on a timestamp.

Figure 5:
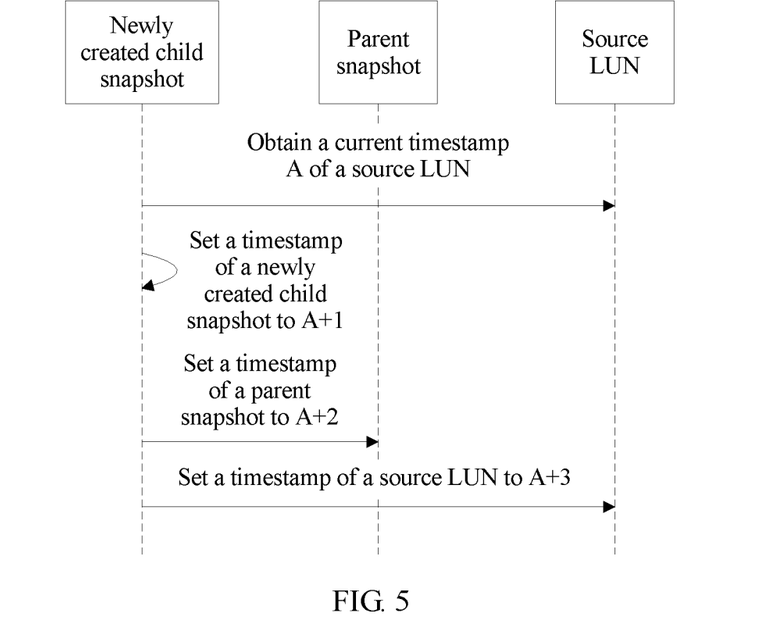
FIG. 5 is a schematic diagram of setting a timestamp according to an embodiment of the present invention.

A method for setting a globally unique timestamp is shown in FIG. 5: During creation of a new child snapshot, a current timestamp of a source LUN is first obtained, and the current timestamp of the source LUN is set to A. A timestamp of the newly created child snapshot may be set to A+1, and then a timestamp of a parent snapshot is set to A+2, and a timestamp of the source LUN is set to A+3, so that in cascaded snapshots, timestamps are in descending order from the source LUN to the child snapshot.

The method for setting a timestamp in FIG. 5 is merely an embodiment. If the newly created snapshot is a snapshot taken for the source LUN, after the timestamp of the newly created snapshot is set to A+1, the timestamp of the source LUN is directly set to A+2; if there is a parent snapshot for the parent snapshot of the newly created child snapshot, after the timestamp of the parent snapshot is set to A+2, a timestamp of the parent snapshot of the parent snapshot is further set, until the timestamp of the source LUN is set, so that timestamps are in descending order from the source LUN to a bottommost child snapshot. In addition, during the foregoing timestamp setting, a timestamp difference between layers is set to 1 as an example, but the present invention is not limited to this.

Target data in a snapshot includes copy-on-write (COW) data and/or private data. In a COW technology, when new data is written to a specific storage location for a first time, original content is first read and written to another location (this is the COW data), and then the new data is written to the storage device (this is the private data). However, no copy-on-write operation is performed for a next write operation at this location. The COW data is generated after a child snapshot is created.

When a write operation is performed on the first snapshot after a child snapshot of the first snapshot, namely, the third snapshot, is created, COW data is generated. Because the third snapshot is associated with data that is in the first snapshot when the third snapshot is created, when the third snapshot is read, only the data that is in the first snapshot when the third snapshot is created is considered. Data that is written to the first snapshot after the third snapshot is created is not considered.

In step 402, when the information of the target data in the first snapshot is migrated to the second snapshot, for data at each data address, whether the target data in the first snapshot includes COW data may be first detected.

If the target data in the first snapshot includes the COW data, it indicates that a write operation has been performed on the first snapshot after the third snapshot is created. In this case, the COW data stores data that is in the first snapshot before the write operation, in other words, the data associated with the third snapshot. Therefore, when the information of the target data in the first snapshot is migrated to the second snapshot, only information of the COW data in the first snapshot may be migrated to the second snapshot.

If the target data in the first snapshot does not include any COW data, it indicates that no write operation has been performed on the first snapshot after the third snapshot is created. In this case, the private data is data that is in the first snapshot when the third snapshot is created, in other words, the data associated with the third snapshot. Therefore, when the information of the target data in the first snapshot is migrated to the second snapshot, information of the private data in the first snapshot is migrated to the second snapshot.

Optionally, to implement quick data migration, metadata of the target data in the first snapshot may be migrated to the second snapshot, in other words, an address of the target data in the first snapshot may be migrated to the second snapshot. Because the migrated information of the target data includes the address of the target data and the timestamp of the first snapshot when the first snapshot is created, a migration process can be quickly implemented to improve system efficiency.

Step 403: Set a parent snapshot identifier corresponding to a third snapshot to an identifier of the second snapshot.

In other words, the set parent snapshot identifier corresponding to the third snapshot indicates that a parent snapshot of the third snapshot is the second snapshot.

Step 404: Delete the first snapshot.

In the foregoing embodiment of the present invention, if a snapshot at an intermediate layer of the cascaded snapshots needs to be deleted, in other words, if a snapshot having a child snapshot needs to be deleted, data in a to-be-deleted snapshot may be first migrated to a parent snapshot of the to-be-deleted snapshot. In this way, after the to-be-deleted snapshot is deleted, for a child snapshot of the deleted snapshot, data associated with the child snapshot can still be read from the parent snapshot of the deleted snapshot.

For clearer understanding of the foregoing embodiment of the present invention, a specific embodiment is used in the following to describe a specific implementation process of the foregoing embodiment of the present invention.

Figure 6A:
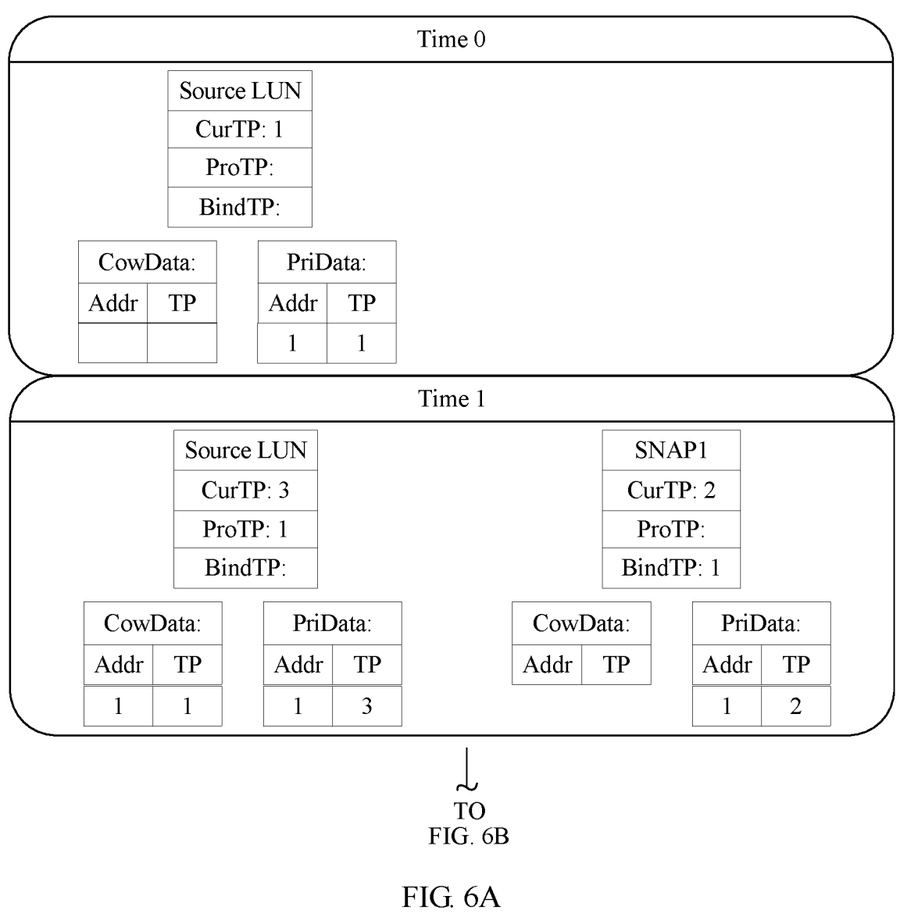
FIG. 6A and FIG. 6B are a schematic diagram of creating a cascaded snapshot according to an embodiment of the present invention.
Figure 6B:
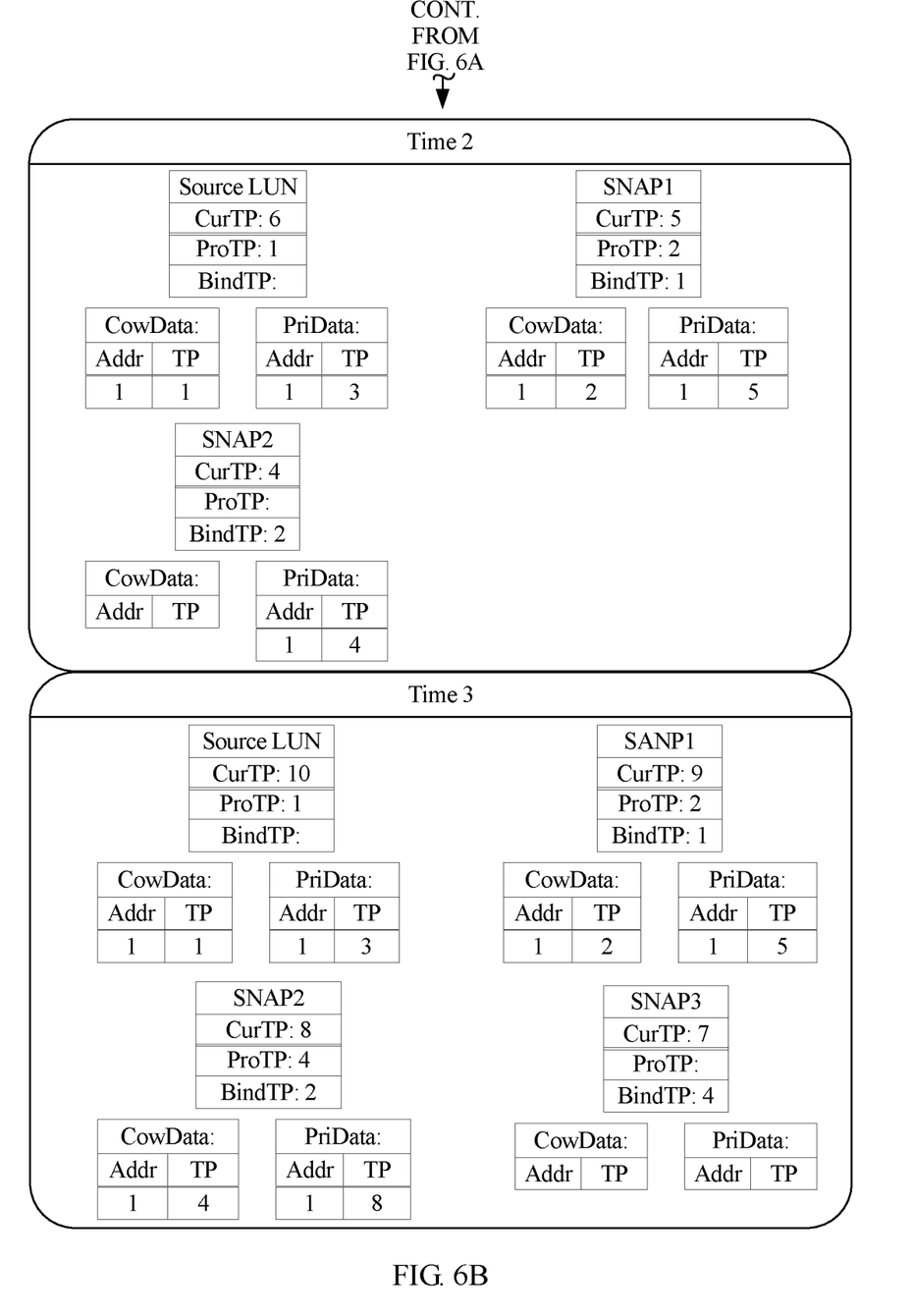

FIG. 6A and FIG. 6B are a schematic diagram of creating a cascaded snapshot, where:

CurTP indicates a timestamp of a source LUN (snapshot);

ProTP indicates a protected timestamp of the source LUN (snapshot); and

BindTP indicates a time point before a snapshot is created for a parent snapshot associated with the snapshot.

At a moment Time 0, a CurTP of the source LUN is set to 1. In private data (PriData) of the source LUN, a time point (TP) of data at an address (Addr) 1 is 1 and indicates that the CurTP of the source LUN is 1 when the data is written. Because no snapshot is created for the source LUN, in this case, the source LUN does not have COW data.

At a moment Time 1, a snapshot 1 is created for the source LUN. First, it is obtained that the CurTP of the source LUN before the snapshot 1 is created is 1. Therefore, a CurTP of the snapshot 1 is set to 2, and then the CurTP of the source LUN is set to 3. For the source LUN, if a write operation is performed on the source LUN after the snapshot 1 is created, before new data is written, original data needs to be written to COW data (CowData). The original data is the private data whose TP is 1; therefore, a TP of the data in the CowData is 1. The TP of the CowData is a protected time point (namely, ProTP); therefore, a ProTP of the source LUN is 1. The newly written data is stored in the PriData, and in this case, the CurTP of the source LUN is 3; therefore, a TP of the PriData is 3. For the snapshot 1, the snapshot 1 is associated with the data that is in the source LUN before the snapshot 1 is created; therefore, a BindTP of the snapshot 1 is the CurTP that is of the source LUN before the snapshot 1 is created, in other words, the BindTP of the snapshot 1 is 1. When a write operation is performed on the snapshot 1, written data is stored in PriData, and the CurTP of the snapshot 1 is 2 when the data is written to the snapshot 1; therefore, a TP of the PriData is 2.

At a moment Time 2, a child snapshot, namely, a snapshot 2, is created for the snapshot 1. First, it is obtained that the CurTP of the source LUN before the snapshot 2 is created is 3. Therefore, a CurTP of the snapshot 2 is set to 4, and then the CurTP of the snapshot 1 is set to 5, and the CurTP of the source LUN is set to 6. For the snapshot 1, if a write operation is performed on the snapshot 1 after the snapshot 2 is created, before new data is written, original data needs to be written to the CowData. The original data is the PriData whose TP is 2; therefore, a TP of the data in the CowData is 2. The TP of the CowData is a ProTP; therefore, a ProTP of the snapshot 1 is 2. The newly written data is stored in the PriData, and in this case, the CurTP of the snapshot 1 is 5; therefore, the TP of the PriData is 5. For the snapshot 2, the snapshot 2 is associated with the data that is in the snapshot 1 before the snapshot 2 is created; therefore, a BindTP of the snapshot 2 is the CurTP that is of the snapshot 1 before the snapshot 2 is created, in other words, the BindTP of the snapshot 2 is 2. When a write operation is performed on the snapshot 2, written data is stored in PriData, and the CurTP of the snapshot 2 is 4 when the data is written to the snapshot 2; therefore, a TP of the PriData is 4.

At a moment Time 3, a child snapshot, namely, a snapshot 3, is created for the snapshot 2. First, it is obtained that the CurTP of the LUN before the snapshot 3 is created is 6. Therefore, a CurTP of the snapshot 3 is set to 7, and then the CurTP of the snapshot 2 is set to 8, the CurTP of the snapshot 1 is set to 9, and the CurTP of the source LUN is set to 10. For the snapshot 2, if a write operation is performed on the snapshot 2 after the snapshot 3 is created, before new data is written, original data needs to be written to the CowData. The original data is PriData whose TP is 4; therefore, a TP of the data in the CowData is 4. The TP of the CowData is a ProTP; therefore, a ProTP of the snapshot 2 is 4. The newly written data is stored in the PriData, and in this case, the CurTP of the snapshot 2 is 8; therefore, the TP of the PriData is 8. For the snapshot 3, the snapshot 3 is associated with the data that is in the snapshot 2 before the snapshot 3 is created; therefore, a BindTP of the snapshot 3 is the CurTP that is of the snapshot 2 before the snapshot 3 is created, in other words, the BindTP of the snapshot 3 is 4.

Figure 7:
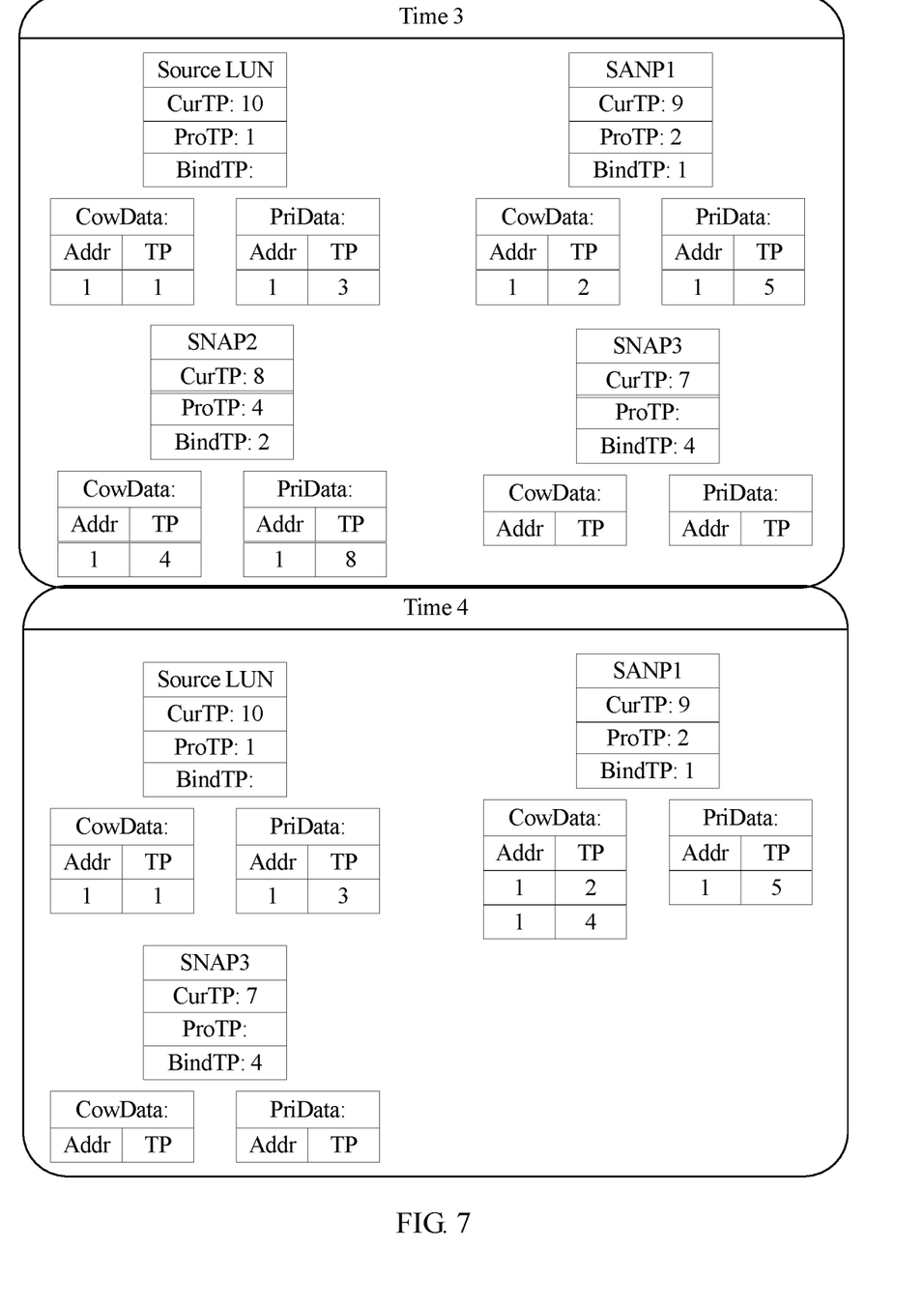
FIG. 7 is a schematic diagram of deleting a cascaded snapshot according to an embodiment of the present invention.

After the cascaded snapshots are created, if the snapshot 2 needs to be deleted, according to the prior art, the snapshot 2 cannot be directly deleted, and the snapshot 3 needs to be deleted before the snapshot 2 is deleted. According to the method provided in this embodiment of the present invention, the snapshot 2 can be directly deleted without a need to delete the snapshot 3, and when the snapshot 3 is read after the snapshot 2 is deleted, no data reading error occurs. FIG. 7 is a schematic diagram of deleting the snapshot 2 according to the deletion method provided in this embodiment of the present invention.

At a moment Time 4, after an instruction for deleting the snapshot 2 is received, whether the snapshot 2 includes CowData is first detected. When it is detected that the snapshot 2 includes the CowData, information of the Cow-Data in the snapshot 2 is migrated to the snapshot 1. The migrated information of the CowData includes an Addr and a TP of the CowData. The TP is a CurTP of the snapshot 1 when the snapshot 2 is created. Because the CurTP is unique in CurTPs of all snapshots of the source LUN, the TP of the CowData can uniquely identify data that is in the snapshot 2, and can distinguish between the CowData migrated to the snapshot 1 and the CowData in the snapshot 1. After the CowData in the snapshot 2 is migrated to the snapshot 1, the snapshot 2 may be deleted.

It should be noted that in the foregoing specific embodiment, data at an Addr 1 is merely used as an example. For the data at the Addr 1, because there is CowData, information of the CowData at the Addr 1 is migrated to the snapshot 1. For data at other addresses, determining needs to be performed respectively.

In some other embodiments, CowData and PriData may need to be merged first for data at all locations of the snapshot 2. During the mergence, for data at each location, if there is CowData, the CowData is retained, or if there is no CowData, PriData is retained, and then data merged at all locations is migrated to the snapshot 1.

Based on a same technical concept, an embodiment of the present invention further provides an apparatus for deleting a cascaded snapshot. The apparatus is configured to implement the foregoing method embodiment and is applied to a storage device. The storage device includes a logical volume, the logical volume corresponds to a plurality of cascaded snapshots, and the plurality of cascaded snapshots include at least a first snapshot, a second snapshot, and a third snapshot. The second snapshot is a parent snapshot of the first snapshot. The parent snapshot of the second snapshot may be an independent snapshot or may be a logical volume. The third snapshot is a child snapshot of the first snapshot.

Figure 8:
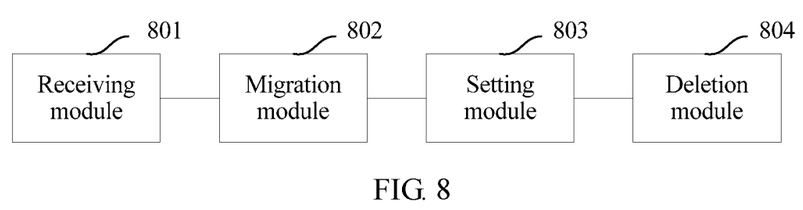
FIG. 8 is a schematic structural diagram of an apparatus for deleting a cascaded snapshot according to an embodiment of the present invention.

FIG. 8 is a schematic structural diagram of an apparatus for deleting a cascaded snapshot according to an embodiment of the present invention. As shown in the figure, the apparatus includes:

a receiving module 801, configured to receive an instruction for deleting the first snapshot, where the first snapshot includes target data;

a migration module 802, configured to migrate information of the target data to the second snapshot;

a setting module 803, configured to set a parent snapshot identifier corresponding to the third snapshot to an identifier of the second snapshot, where the set parent snapshot identifier corresponding to the third snapshot indicates that a parent snapshot of the third snapshot is the second snapshot; and a deletion module 804, configured to delete the first snapshot.

Optionally, the information of the target data includes a timestamp of the first snapshot, and the timestamp of the first snapshot is set when the first snapshot is created. Each cascaded snapshot corresponding to the logical volume has one timestamp, and the timestamp of each cascaded snapshot is unique.

Optionally, the target data includes copy-on-write data and/or private data, the copy-on-write data is data that is copied when copy-on-write is performed on the first snapshot, and the private data is data that is written when a write operation is performed on the first snapshot; and for data at each data address, when the target data includes the copy-on-write data, the migration module 802 is specifically configured to migrate information of the copy-on-write data to copy-on-write data in the second snapshot.

Optionally, the target data includes copy-on-write data and/or private data, the copy-on-write data is data that is copied when copy-on-write is performed on the first snapshot, and the private data is data that is written when a write operation is performed on the first snapshot; and for data at each data address, when the target data does not include any copy-on-write data, the migration module 802 is specifically configured to migrate information of the private data to copy-on-write data in the second snapshot.

Optionally, the information of the target data further includes an address of the target data.

In the foregoing embodiment of the present invention, if a snapshot at an intermediate layer of the cascaded snapshots needs to be deleted, in other words, a snapshot having a child snapshot needs to be deleted, data in a to-be-deleted snapshot may be first migrated to a parent snapshot of the to-be-deleted snapshot. In this way, after the to-be-deleted snapshot is deleted, for a child snapshot of the deleted snapshot, data associated with the child snapshot can still be read from the parent snapshot of the deleted snapshot.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams, and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or other programmable data processing devices, so that a series of operations and steps are performed on the computer or the other programmable devices, thereby generating computer-implemented processing. Therefore, the instructions executed on the computer or the other programmable devices provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the following claims shall be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations on the present invention provided that these modifications and variations fall within the scope of protection defined by the following claims and their equivalent technologies of the present invention.

What is claimed is:

1. A method for deleting a cascaded snapshot in a storage device, the storage device comprising a logical volume corresponding to a plurality of cascaded snapshots, wherein the plurality of cascaded snapshots comprise at least a first snapshot, a second snapshot, and a third snapshot, and wherein the method comprises:
   receiving an instruction for deleting the first snapshot, wherein the first snapshot comprises target data;
   migrating information of the target data to the second snapshot, wherein the second snapshot is a parent snapshot of the first snapshot;
   setting a parent snapshot identifier corresponding to the third snapshot to an identifier of the second snapshot, wherein the third snapshot is a child snapshot of the first snapshot and the set parent snapshot identifier corresponding to the third snapshot indicates that a parent snapshot of the third snapshot is the second snapshot not the first snapshot; and
   deleting the first snapshot; and, wherein
   the information of the target data comprises a timestamp of the first snapshot, the timestamp of the first snapshot being set when the first snapshot is created, and
   each cascaded snapshot corresponding to the logical volume has one unique timestamp, wherein the timestamp of the first snapshot is a sum of a current timestamp of a logic volume and a preset threshold.

2. The method according to claim 1, wherein the target data comprises copy-on-write data and/or private data, the copy-on-write data being copied when an copy-on-write operation is performed on the first snapshot, and the private data being written when a write operation is performed on the first snapshot; and
   for data at each data address, when the target data comprises the copy-on-write data, the migrating information of the target data to the second snapshot comprises:
   migrating information of the copy-on-write data to copy-on-write data in the second snapshot.

3. The method according to claim 1, wherein the target data comprises copy-on-write data and/or private data, the copy-on-write data being copied when a copy-on-write operation is performed on the first snapshot, and the private data being written when a write operation is performed on the first snapshot; and
   for data at each data address, when the target data does not comprise copy-on-write data, the migrating information of the target data to the second snapshot comprises:
   migrating information of the private data to copy-on-write data in the second snapshot.

4. The method according to claim 1, wherein the information of the target data further comprises an address of the target data.

5. A storage device, comprising a processor and a logical volume,
   wherein the logical volume corresponds to a plurality of cascaded snapshots, wherein the plurality of cascaded snapshots comprise at least a first snapshot, a second snapshot, and a third snapshot, and
   wherein the processor is configured to:
   receive an instruction to delete the first snapshot, wherein the first snapshot comprises target data;
   migrate information of the target data to the second snapshot, wherein the second snapshot is a parent snapshot of the first snapshot;
   set a parent snapshot identifier corresponding to the third snapshot to an identifier of the second snapshot, wherein the third snapshot is a child snapshot of the first snapshot and the set parent snapshot identifier corresponding to the third snapshot indicates that a parent snapshot of the third snapshot is the second snapshot not the first snapshot; and
   delete the first snapshot; and, wherein
   the information of the target data comprises a timestamp of the first snapshot, the timestamp of the first snapshot being set when the first snapshot is created, and
   each cascaded snapshot corresponding to the logical volume has one unique timestamp, wherein the timestamp of the first snapshot is a sum of a current timestamp of a logic volume and a preset threshold.

6. The storage device according to claim 5, wherein the target data comprises copy-on-write data and/or private data, the copy-on-write data is data being when a copy-on-write operation is performed on the first snapshot, and the private data being written when a write operation is performed on the first snapshot; and
   for data at each data address, when the target data comprises the copy-on-write data, the processor specifically configured to:
   migrate information of the copy-on-write data to copy-on-write data in the second snapshot.

7. The storage device according to claim 5, wherein the target data comprises copy-on-write data and/or private data, the copy-on-write data being copied when a copy-on-write operation is performed on the first snapshot, and the private data being written when a write operation is performed on the first snapshot; and
   for data at each data address, when the target data does not comprise copy-on-write data, the processor specifically configured to:
   migrate information of the private data to copy-on-write data in the second snapshot.

8. The storage device according to claim 5, wherein the information of the target data further comprises an address of the target data.

* * * * *